US009380192B2

(12) United States Patent
Barthel (10) Patent No.: US 9,380,192 B2
(45) Date of Patent: Jun. 28, 2016

(54) COMPONENT ASSEMBLY FOR SIMPLIFIED INSTALLATION ON A VEHICLE (75) Inventor: Joachim Barthel, Essen (DE)

(73) Assignee: HUF HULSBECK & FURST GMBH & CO. KG (DE)

(*) Notice: Subject to any disclaimer, the term of this patent is extended or adjusted under 35 U.S.C. 154(b) by 206 days.

(21) Appl. No.: 13/984,862

(22) PCT Filed: Jan. 24, 2012

(86) PCT No.: PCT/EP2012/051053
§ 371 (c)(1),
(2), (4) Date: Aug. 29, 2013

(87) PCT Pub. No.: WO2012/107277
PCT Pub. Date: Aug. 16, 2012

(65) Prior Publication Data
US 2013/0335624 A1 Dec. 19, 2013

(30) Foreign Application Priority Data
Feb. 11, 2011 (DE) .......................... 10 2011 000 683

(51) Int. Cl.
H04N 5/225 (2006.01)
B60R 11/04 (2006.01)
B60R 11/00 (2006.01)

(52) U.S. Cl.
CPC .............. *H04N 5/2251* (2013.01); *B60R 11/04* (2013.01); *B60R 2011/0094* (2013.01)

(58) Field of Classification Search
CPC .................................................... H04N 5/2251
See application file for complete search history.

(56) References Cited

U.S. PATENT DOCUMENTS 4,407,042 A 10/1983 Schramme
8,836,789 B2 * 9/2014 Liepold et al. ................ 348/148
(Continued)

FOREIGN PATENT DOCUMENTS

CN 200988459 Y 12/2007
CN 101528506 A 9/2009
(Continued)

OTHER PUBLICATIONS

International Search Report for corresponding application PCT/EP2012/051053 filed Jan. 24, 2012; Mail date Apr. 4, 2012.
(Continued)

Primary Examiner — Twyler Haskins
Assistant Examiner — Fayez Bhuiyan
(74) Attorney, Agent, or Firm — Cantor Colburn LLP (57) ABSTRACT The invention relates to a device, particularly for a tailgate (1) of a vehicle, comprising a camera unit (10) which is used to capture images of the outer region (4) of a vehicle, and a drive (20) by means of which the camera unit (10) can be transferred between a rest mode (2) and an operational mode (3), the camera unit (10) being protected from the outer region (4) by means of a cover element (11) when in the rest mode (2), an image being able to be captured by means of the camera unit (10) when in the operational mode (3), a control unit (30) being provided which is used to control a part of the vehicle, a carrier (40) being provided in which the camera unit (10) is arranged and which simultaneously acts as a housing for said camera unit (10), and the carrier (40) having such mounting interfaces (41) that the drive (20) and the control unit (30) are held on the carrier (40) in a reliable manner to form a common installation assembly which can be fixed to the vehicle.

21 Claims, 7 Drawing Sheets

(56) References Cited

U.S. PATENT DOCUMENTS

2003/0098908 A1* 5/2003 Misaiji ............... B60R 1/00
    348/148
2006/0025459 A1  2/2006  Demont

FOREIGN PATENT DOCUMENTS

| DE | 602004003255 T2 | 5/2007 |
| DE | 102006039192 A1 | 2/2008 |
| DE | 102006048373 A1 | 4/2008 |
| DE | 102007052402 A1 | 5/2009 |
| DE | 102008010966 A1 | 8/2009 |
| DE | 102008046453 A1 | 3/2010 |
| DE | 102009008281 A1 | 8/2012 |

OTHER PUBLICATIONS

Chinese Office Action for corresponding application 201280008498.5; Date of Issuance Apr. 3, 2015.

* cited by examiner

COMPONENT ASSEMBLY FOR SIMPLIFIED INSTALLATION ON A VEHICLE

TECHNICAL FIELD

The invention relates to a device, particularly for a rear hatch of a vehicle, having a camera device which serves the purpose of producing images of the exterior of a vehicle, and having a drive by means of which it is possible to transition the camera device between a standby mode and an operating mode.

BACKGROUND

A camera device for the purpose of producing images of an exterior of a vehicle is disclosed in DE 10 2007 052 402.3. This camera device can be used in assisted parking applications for motor vehicles. The camera device produces in the interior of the vehicle an image of the external area, particularly the rear view of the motor vehicle, on a display screen for the vehicle drive, and this constitutes a significant aid for the driver. The practice of attaching such a device, having a camera device, on various different points of a vehicle, is known—for example on a bumper, on a quarter panel, on a rear body panel, etc.

In addition, a camera device is disclosed in DE 60 2004 003 255 T2 which has a drive which can move a cover element between a closed position and an open position. When the cover element is in the closed position, the camera device is protected from the outside world. In addition, configurations wherein both the drive and the camera device and/or the cover element can move are also known. Fixed camera devices are likewise known, wherein only the cover element is moved by the drive.

In addition, in many cases, the vehicle has operating devices, particularly in close proximity to the camera device, which can serve the purpose of operating various vehicle components.

It has proven disadvantageous that the installation of the components named above requires intensive inputs.

BRIEF SUMMARY

The problem addressed by the present invention is that of creating a device of the type specified above which avoids the disadvantages named above, wherein particularly a device is provided which enables a simplified installation, while at the same time ensuring reliable functionality of the installed components on the vehicle.

According to the invention, the device has a camera device which serves the purpose of producing images of the external area of the vehicle. In addition, the device has a drive whereby it is possible to transition the camera device between a standby mode and an operating mode, wherein in the standby mode the camera device is protected from the outside area by a cover element, and in the operating mode it is possible to capture images by means of the camera device. In addition, an operating device is included which serves the purpose of operating a vehicle component. In addition, the device according to the invention has a support in which the camera device is arranged, which also functions simultaneously as the housing for the camera device. The support has particular attachment interfaces such that the drive and the operating device are reliably held on the support and form a unified assembly which can be attached to the vehicle.

The special feature of the invention is that it is possible to arrange both the camera device, and the drive and the operating device, on the support according to the invention, and to subsequently attach the same to the vehicle as one unified installation assembly. As such, it is possible to carry out a prefabrication, such that it is possible to significantly reduce the amount of time applied to the installation on the vehicle, and simultaneously to increase the ease of installation. In order to accordingly attach the camera device, the drive, and the operating device on the support, the support has corresponding attachment interfaces which provide a reliable hold for each respective component during the installation, and of course in the installed position of the device as a whole. A further advantage of the invention is that it is possible to install the assembly from only one side, in contrast to the prior art, wherein the assembly being installed is installed from the outside, and the remaining components are installed from the inside of the vehicle, by way of example. This difference according to the invention also contributes to further ease of installation.

In one possible embodiment of the invention, the drive can have a functional connection to the camera device such that the camera device can be moved between a standby position, in which the camera device is in the standby mode, and an operating position, in which the camera device is in the operating mode. According to the invention, it can be contemplated that a fixed camera device is included inside the support, and has the same position in both the standby mode and the operating mode. Only the cover element moves, via the drive, between a closed position and an open position— wherein in the open position, the camera device can capture an image of the exterior area of the vehicle. When the cover element is in the closed position, the camera device is in standby mode. As an alternative, the camera device can be mounted to move inside the support, wherein the drive provides a corresponding movement of the camera device.

The drive can have a functional connection to both the camera device and/or the cover element. It can likewise be contemplated that the camera device moves the cover element out of its closed position and into the open position by means of a movement of the camera device by the drive in a defined position of the camera device, in the direction of its operating position.

In addition, it can be contemplated that the operating device is a button which can be operated from the external area of the vehicle, and which is particularly connected to a locking and unlocking device of the rear hatch of the vehicle. The button can be an electronic button, by way of example, which can also function mechanically, wherein an actuation thereof moves contacts. Via an actuation thereof, contacts can be closed—meaning brought into contact with each other— thereby making it possible to trigger an operation of the vehicle component. The operating device can be designed as a membrane button which has conductive paths made of film. An actuation of this button leads to a connection of the conductive paths lying opposite each other, and therefore to a contact which serves the purpose of switching and/or operating a vehicle component. The button can also be a touch button which detects the reaction to pressure or to proximity. By way of example, a sound sensor, a capacitive switch, a piezo button, etc. can be contemplated. The locking and unlocking device can be a lock, by way of example, which functions such that the rear hatch can be locked and/or unlocked.

In a further measure which improves the invention, the mechanism can be designed in such a manner that the camera device can be moved on a path of a circle segment between the standby position and the operating position, wherein the path of the circle segment runs at least partially around the operating device. Because the camera device runs at least partially around the operating device, the configuration achieves a particularly space-saving construction of the device as a whole.

The mechanism can advantageously have one axis about which the camera device can be moved, wherein the axis is particularly oriented to the platform of the vehicle. However, the axis is generally oriented at an incline to the platform of the vehicle, at a defined angle. In contrast to the prior art, wherein the pivot axis runs horizontal to the platform of the vehicle, a compact construction can be achieved by the present invention.

In one possible embodiment of the device according to the invention, the attachment interfaces can be included on the outer contour of the support. The drive and/or the operating device are preferably attached on the outer contour of the support. The camera device is positioned inside of the support that is, in an interior space.

It is likewise possible for the drive and/or the operating device to be attached, in a positive-fitting and/or force-fitting manner, particularly via a locking connection and/or a clip connection.

The mechanism can preferably be arranged at least partially inside the support. It is likewise possible that the mechanism has a pivot arm which connects the camera device to the axis, wherein the pivot arm is particularly L-shaped and/or has an extension thereof which runs at an angle thereto. The L-shaped pivot arm is positioned behind the operating device, wherein the pivot arm is hinged on one side on the axis of rotation. The camera device is advantageously attached on the opposite side of the pivot arm, wherein this side of the pivot arm is arranged on the side of the operating device.

In one measure which improves the invention, the pivot arm can have a recess and/or attachment means for the camera device, in order to fix the camera device on the pivot arm. The recess and the attachment means can preferably form a monolithic component together with the pivot arm, wherein the recess is particularly a ring-shaped opening through which the camera device partially extends, and the attachment means is a locking element which reliably holds the camera device in the opening.

In addition, it can be contemplated that the mechanism has a coupling element with a driving dog which is hinged onto the coupling element and which is connected to the pivot arm in a torque-proof manner, wherein the coupling element can be moved by the drive. In addition, a crank element having an eccentric can be arranged between the coupling element and the drive, said eccentric engaging with the coupling element.

According to the invention, a part of the mechanism can be arranged inside the support, and particularly the pivot arm can be arranged, in a manner allowing movement, inside the support. In addition, it can be contemplated that a part of the mechanism is arranged outside of the support, and particularly that the coupling element and/or the driving dog and/or the crank element are positioned outside of the support. The drive, which can be a rotary drive, drives the crank element which rotates about an axis of rotation. In this manner, the eccentric arranged on the crank element acts on the coupling element, and the coupling element in turn pivots the driving dog about the axis which is simultaneously the axis of rotation of the pivot arm. Because the driving dog is connected in a torque-proof manner with the pivot arm, there is a movement of the camera device into its corresponding position. In this manner, the mechanism is designed to move the camera device in such a manner that the camera device pivots about the axis, from the standby position into the operating position, at an angle which is less than 30°, and preferably less than 20°. The camera device therefore only executes a minimal pivot movement, which is advantageous for the routing of the cables of the camera device, said cables leading out of the support and into the vehicle interior.

In one possible embodiment of the invention, a rod element can connect the cover element to the pivot arm and/or to the camera device, wherein the rod element is hinged on the cover element as well as on the pivot arm and/or on the camera device, and is able to move. At the same time, the cover element forms the unified installation assembly which can be attached to the vehicle.

In addition, the support can have exterior locking elements which serve to secure the installation assembly on the vehicle. The locking element can work together with a counter locking element which can be arranged on the support during the installation, thereby preventing the installation assembly from falling off of, and/or coming apart from, the vehicle.

In a further embodiment of the invention, the support has an opening through which the camera device extends, at least partially, when in its operating mode, and/or the camera device is oriented in the direction of the opening of the support in order to capture an image of the exterior area of the vehicle. The opening is oriented advantageously in the direction of the platform of the vehicle, such that no complex drainage is necessary. Upon every opening process of the cover element, potential moisture or water fractions are removed from the interior of the support.

The camera device can advantageously be sealed from the outside of the vehicle by two seal planes. It can likewise be contemplated that a first seal plane lies between the support and the vehicle—particularly the vehicle body panel—and a second seal plane lies between the cover element and the support, wherein particularly the first seal plane has a double seal. In this manner, the configuration achieves a reliable seal of the interior space of the support from the outside area of the vehicle.

The invention comprises a method for the attachment of the following components on a vehicle, particularly on a rear hatch of a vehicle:
- a camera device which functions to capture images of the outside area of the vehicle,
- a drive, by means of which the camera device can be transitioned between a standby mode and an operating mode, wherein in the standby mode the camera device is protected via a cover element from the outside area, and in the operating mode it is possible for the camera device to capture an image,
- an operating device which serves the purpose of operating a vehicle component.

The following installation steps are essential to the invention, wherein:
(1) a support is included on which the camera device, the drive, the cover element, and the operating device are attached, and form a prefabricated installation assembly,
(2) the installation assembly is guided from the outside area of the vehicle through an opening of the vehicle and into the installation position inside the vehicle, and
(3) the reliable hold of the installation assembly is achieved by a mechanical securement.

BRIEF DESCRIPTION OF THE DRAWINGS

Addition advantages, features, and details of the invention will become clear from the following description, wherein one embodiment of the invention is described in detail with reference to the figures. The features indicated in the claims and in the description can be essential for the invention either individually or in any and all combinations thereof. In the figures:

DETAILED DESCRIPTION

Figure 1:
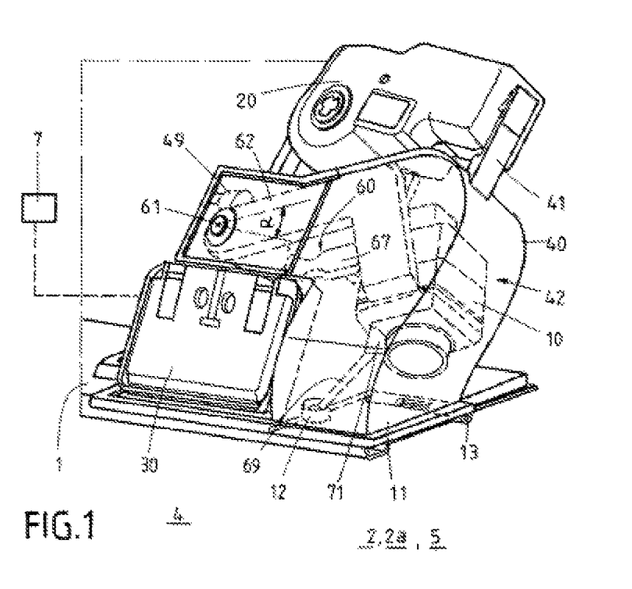
FIG. 1 shows a three-dimensional view of the device according to the invention, having a camera device which is in standby mode.
Figure 2:
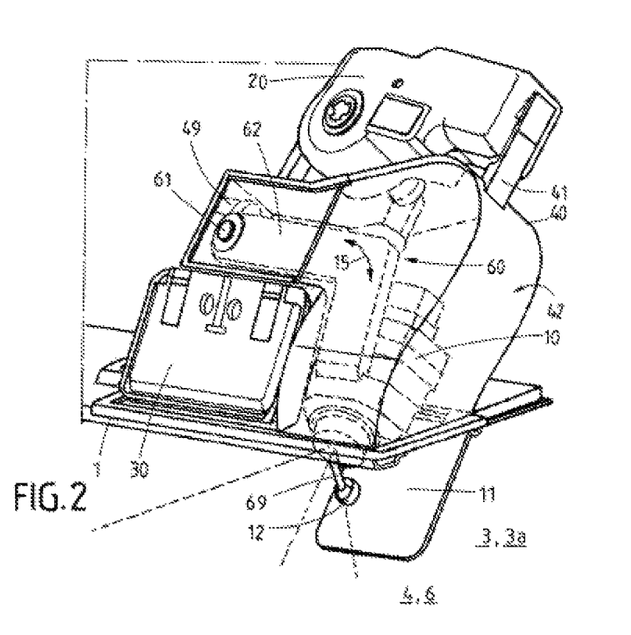
FIG. 2 shows the device according to FIG. 1, wherein the camera device is in an operating mode.
Figure 3:
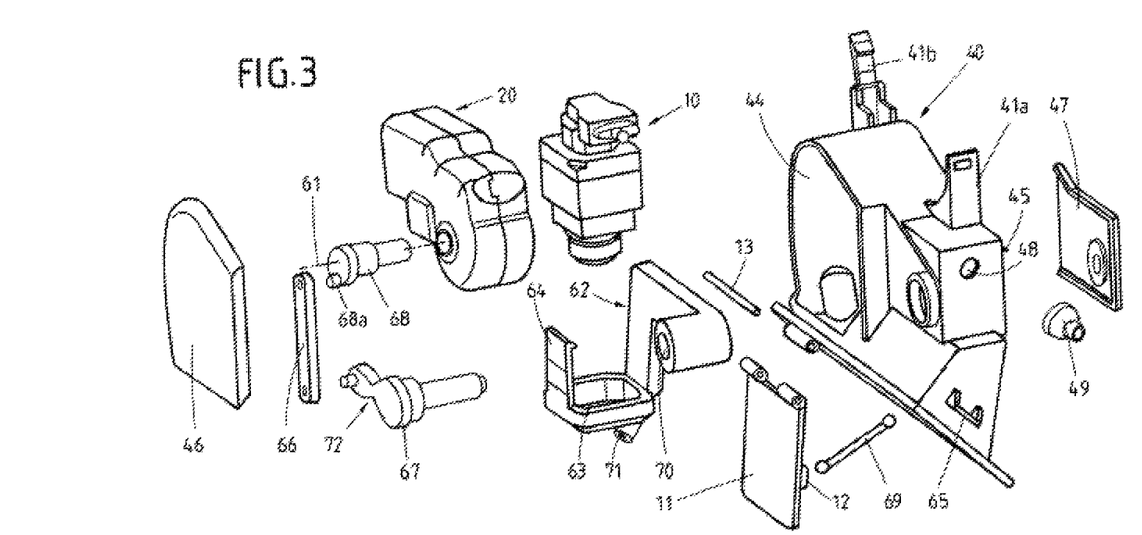
FIG. 3 shows an exploded illustration of the essential components of the device according to the invention according to FIG. 1.

The illustrated device according to FIG. 1 to FIG. 8 shows a camera device 10 which is attached, or can be attached, on a rear hatch 1 of a vehicle. In FIG. 1 and FIG. 3, the camera device is in its standby mode 2, and at the same time in its standby position 2a. In contrast, in FIG. 2 and FIG. 5, the camera device 10 is in its operating mode 3 and therefore in its operating position 3a. In the operating position 3a, it is possible to capture an image of the outside area 4 of the motor vehicle. The camera device 10 is driven via a drive 20. In the standby mode 2 as well as in the standby position 2a, the camera device 10 is protected from the outside area 4 by a cover element 11.

In addition, the device according to the invention has an operating device 30, which serves the purpose of operating a vehicle component 7. The vehicle component 7 is a lock 7 in the present embodiment, which can lock and/or unlock the rear hatch 1. In this case, the operating device 30 is designed as a button which can be manually actuated by the user, by way of example.

As can be clearly seen in the embodiment, a support 40 is included which functions as a housing for the camera device 10. The camera device 10 is arranged in an interior space 42 of the support 40. The support 40 also has attachment interfaces 41 onto which the drive 20 can be attached, which is particularly shown in FIG. 3. The attachment interfaces 41 are arranged on the outer contour of the support 40, wherein the first attachment interface 41a has a lock opening into which the drive 20 can engage with an opposing lock position. The second attachment interface 41b, in contrast, has a lock projection which engages in a recess of the drive 20. Both attachment interfaces 41 are additionally matched to the contour of the drive 20, such that the configuration ensures a reliable hold of the drive 20 on the outer contour of the support 40.

The operating device 30 is attached to the support 40 on the opposite side, on the outside thereof. The attachment can likewise be realized via a locking connection and/or a clip connection. Alternative attachment possibilities can be contemplated, particularly a material connection and/or force-fit connection and/or a positive-fit connection.

A mechanism 60 is located between the drive 20 and the camera device 10, and functions to allow a corresponding movement of the camera device 10 and of the cover element 11. The mechanism 60 has a pivot arm 62 which connects the camera device 10 to the pivot axis 61. The pivot arm 62 is designed in an L-shape, wherein the axis 61 is located on one side of the pivot arm 62. A recess 63 in the form of an opening is constructed on the opposite side of the pivot arm 62. The recess 63 is—as can be easily seen in FIG. 3—designed with a ring shape which reliably holds the camera device 10. In addition, the pivot arm 62 has an attachment means 64 molded onto the pivot arm [62] in the form of a locking element, which reliably holds the camera device 10 in the installed position on the pivot arm 62.

In addition, the mechanism 60 has a coupling element 66 with a driving dog 67 hinged onto the same, said driving dog [67] being attached on the pivot arm 62 in a torque-proof manner. According to the illustrated embodiment, the pivot arm 62 has an opening 70 through which the driving dog 67 extends and is held in a torque-proof manner. As FIG. 3 and FIG. 4 particularly show, a crank element 68 with an eccentric 68a is arranged between the coupling element 66 and the drive 20, wherein the eccentric 68a extends through an opening of the coupling element 66 and is reliably held there.

The special feature of the shown embodiment is that a part of the mechanism 60 is inside the support 40, wherein particularly the pivot arm 62 is positioned inside the interior space 42 of the support 40 and is able to move. In addition, a part of the mechanism 60 is arranged outside of the support 40, so that the transmission of force from the outside drive 20 can be directed into the interior space 42. For this purpose, it is necessary that the coupling element 66, the driving dog 67, and the crank element 68 are positioned outside of the support 40.

Figure 4:
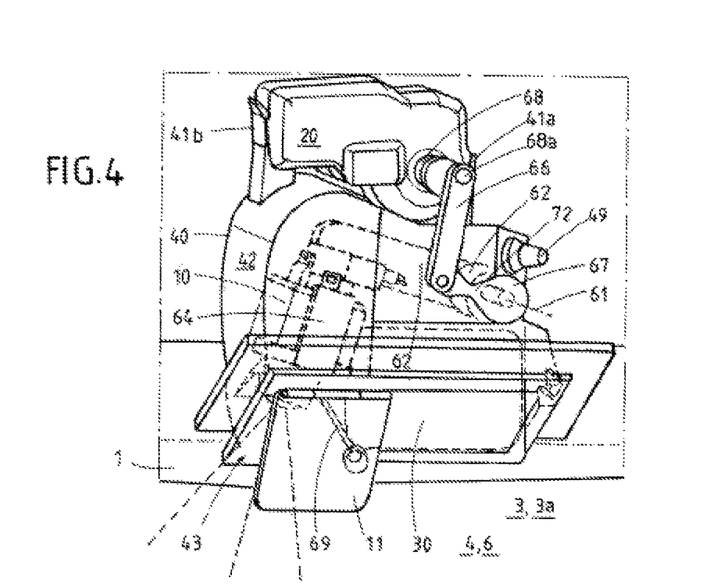
FIG. 4 shows the device according to the invention according to FIG. 2, in another view.
Figure 5:
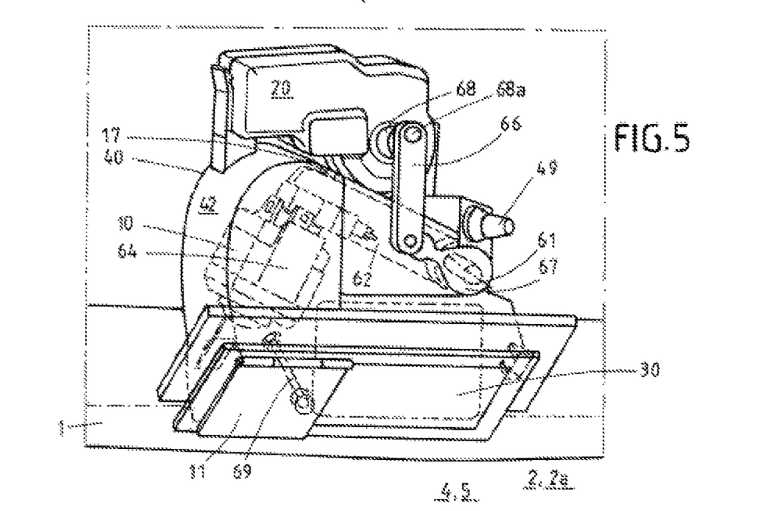
FIG. 5 shows the device according to the invention according to FIG. 1, in another view.

At this point, starting from the standby position 2a of the camera device 10, which is shown in FIG. 5, a rotary movement and/or rotation of the crank element 68 occurs via the drive 20 in a clockwise fashion. As a result, the eccentric 68a presses the coupling element 66 down, thereby pivoting the driving dog 67 counterclockwise a few angular degrees about the axis 61, and into the position shown in FIG. 4. In this way, a force is exerted on the pivot arm 62, which likewise moves counterclockwise about the axis 61, as shown in FIG. 4 and/or FIG. 5; at the same time, the camera device 10 moves toward the opening 43.

Figure 7:
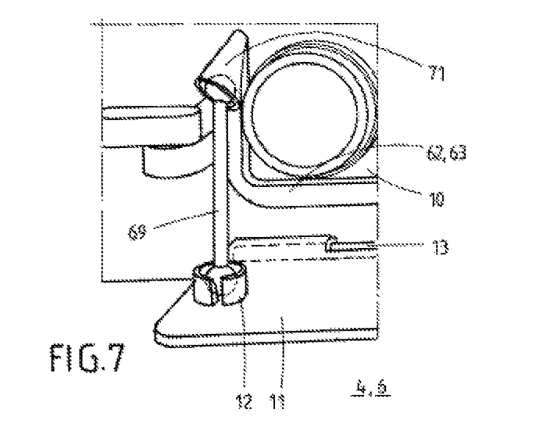
FIG. 7 shows a detail view of the device according to the invention according to FIG. 1.

As is particularly indicated by FIG. 1, FIG. 2, and FIG. 7, a rod element 69 is included which connects the cover element 11 to the pivot arm 62. In this case, the rod element 69 is designed as a ball rod which is designed with a ball shape on both of its free ends. These two ends are each movably jointed in a spherical calotte 12 on the inner side of the cover element 11 and in a calotte 71 of the pivot arm 62. The calotte 71 is situated in the area of the recess 63 of the pivot arm 62. If at this point the pivot arm 62 moves about its axis 61, and the camera device 10 moves out of the standby position 2a into the operating position 3a, the pivot arm 62 simultaneously will press the cover element 11, via the rod element 69, out of its closed position 5 and into the open position 6. The cover element 11 is able to pivot on the support 40, in a rotary movement, via a trunnion link 13, as shown in FIG. 3. The cover element 11 is advantageously spring-loaded, such that a movement of the cover element 11 in the direction of the closed position 5 is supported by the spring loading.

As is particularly indicated in FIG. 1 and FIG. 2, and/or FIG. 4 and FIG. 5, the camera device 10 is pivoted about the axis 61 from the standby position 2a into the operating position 3a, at a minimal angle α, which in the present embodiment is less than 30°. Particularly for the purpose of installing the pivot arm 62 with the camera device 10 into the interior space 42 of the support 40, the support 40 in FIG. 3 has an opening 44 and 45 through which it is possible to bring the corresponding components into the interior space 42. Next, these openings 44, 45 can be closed by two covers 46, 47. In addition, the support 40 has a perforation 48 through which the cable element—which is not explicitly illustrated—of the camera device 10 extends. A rubber element 49, particularly a boot, is attached inside the perforation 48, in order to prevent unnecessary loads on the cable element when the camera device 10 moves.

Figure 6A:
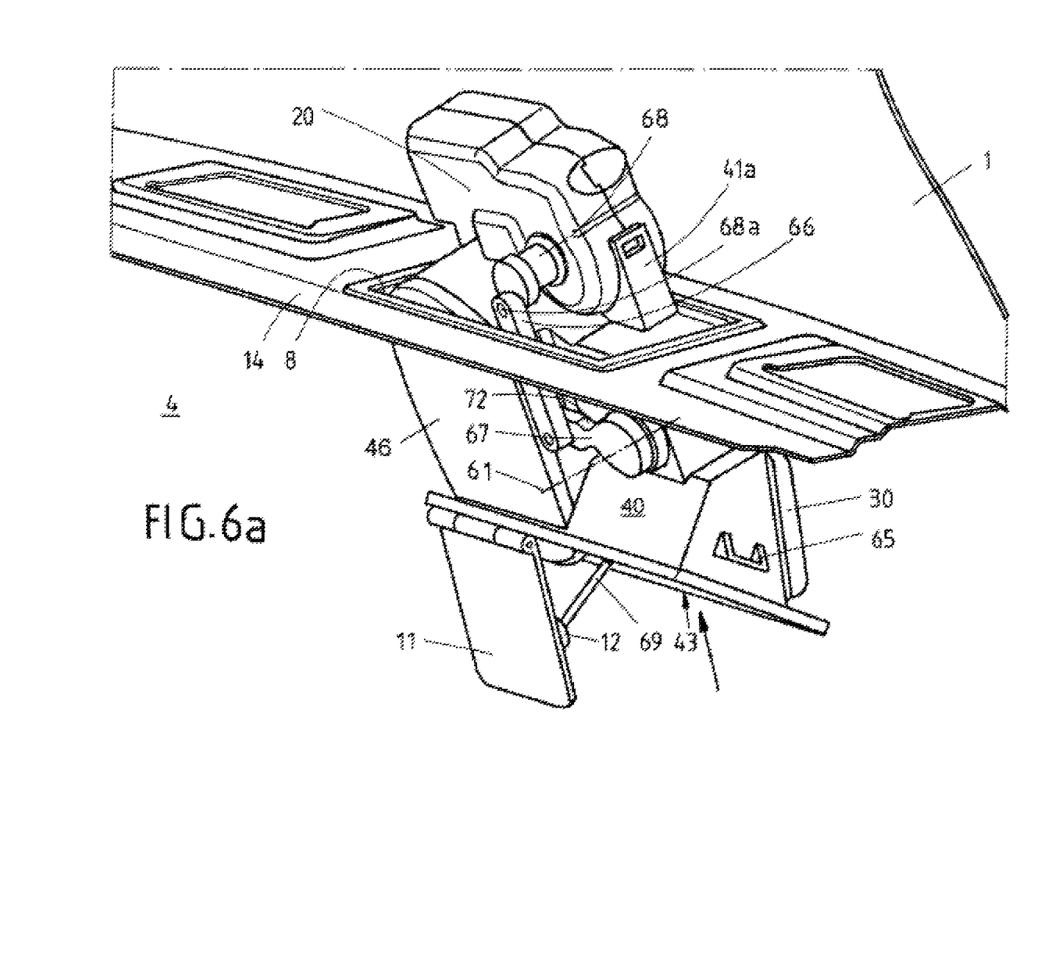
FIG. 6a shows the device according to the invention according to FIG. 1, in a first installation step.
Figure 6B:
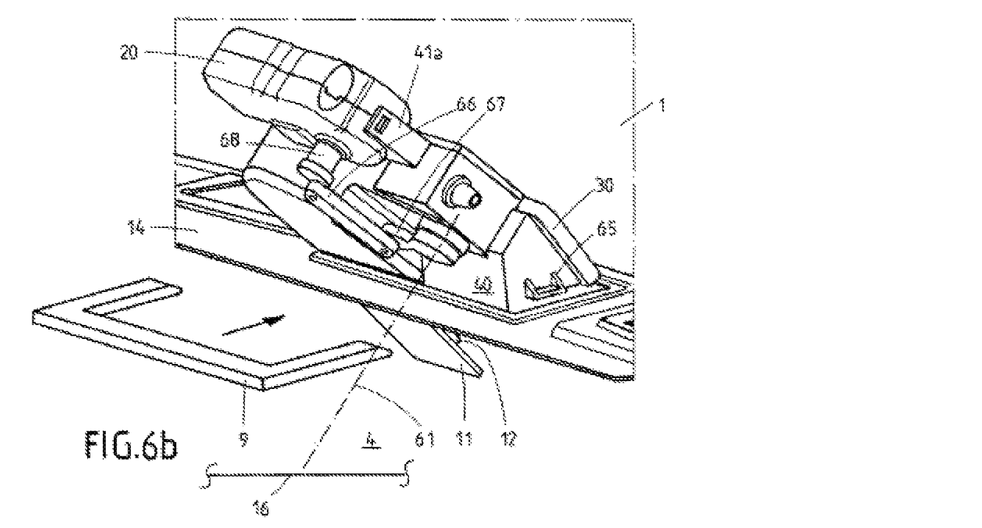
FIG. 6b shows the device according to the invention according to FIG. 1, in a second installation step.
Figure 6C:
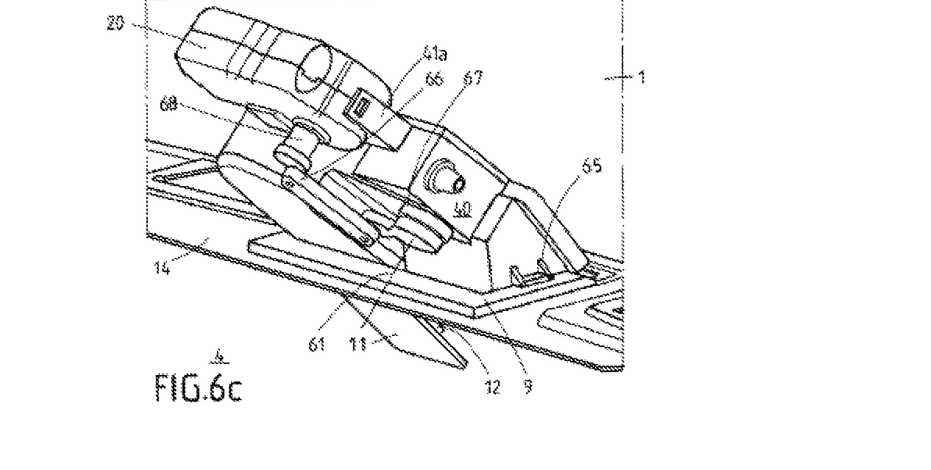
FIG. 6c shows the device according to the invention according to FIG. 1, in a third installation step.

FIGS. 6a to 6c show clearly that the support 40 with the camera device 10, the drive 20, the operating device 30, and the cover element 11 form a prefabricated installation assembly which can be guided through an opening 8 of the rear hatch 1 as a unified component and/or as a unified installation assembly. Next, in a further installation step, this installation assembly is securely fixed on the rear hatch 1 via a locking element 65 which is arranged on the exterior of the support 40 like a projection. For this purpose, an opposing locking element 9 according to FIG. 6b is necessary, and is designed as a bracket which is pushed below the locking element 65 in the method step shown (see FIG. 6c). The opposing locking element 9 can additionally have locking elements which prevent a loosening of the opposing locking element 9. According to FIG. 6c, the support 40 has a further locking element, which is not explicitly shown, which lies on the side opposite that of the locking element 65. The installation of the device according to the invention is completed according to FIG. 6c.

Figure 8:
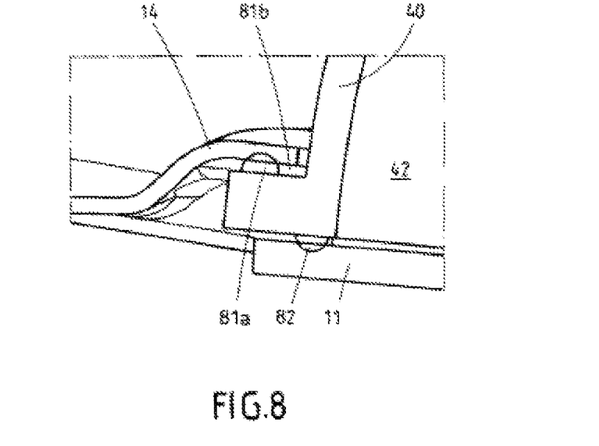
FIG. 8 shows a further detail view of the device according to the invention according to FIG. 1.

FIG. 8 shows that the camera device 10 is sealed from the outside area 4 of the vehicle by two seal planes 81, 82. In this case, the device according to the invention has a first seal plane 81 which lies between the support 40 and the vehicle, particularly the vehicle body panel. The first seal plane 81 is designed with a double seal 81a, b according to this embodiment. A seal 81a is arranged on the support 40. A second seal 81b is included directly next to the seal 81a, and is arranged on the vehicle body panel 41. The second seal plane 82 lies between the cover element 11 and the support 40. The seals of the first and the second seal planes 81, 82 are preferably sprayed onto the support 40 and/or onto the vehicle body panel 14. A sealing of the interior space 42 is reliably achieved via this double seal 81, 82.

In FIG. 1 and FIG. 2, it is clear that the camera device 10 is moved on a path of a circle segment 15 between the standby position 2a and the operating position 3a. In this case, the path of a circle segment 15 partially runs around the operating device 30. As such, the configuration achieves a compact construction overall.

As is particularly shown in FIG. 6b, the rotary axis 61 about which the pivot arm 62 and the camera device 10 can be moved is oriented at an incline to the platform 16 of the vehicle. Such a kinematic arrangement functions so that the camera device 10 only travels a minimal pivot path between the standby position 2a and the operating position 3a.

FIG. 5 shows a further special feature of the mechanism 60 which is arranged between the drive 20 and the camera device 10. In the standby position 2a of the camera device 10, the coupling element 66 is situated above its dead center—meaning that the dead center has been exceeded. At the same time, the pivot arm 62 is on a limit stop 17. The driving dog 67 is also designed with a narrowing 72, which is shown in FIG. 3 and FIG. 4. In this way, the cover element 11 is held in a stable closed position 5. This means that the configuration effectively prevents a willful opening of the cover element 11 from outside. This is based on the fact that the coupling element 66 has slightly exceeded its dead center. If at this point the drive 20 is activated in order to move the camera device 10 in the direction of the operating position 3a, a rotary movement of the crank element 68 occurs counterclockwise, wherein the coupling element 66—generally speaking—moves along upwards. Because, however, the pivot arm 62 is already abutting the limit stop, the driving dog 67 cannot move about the axis 61 in a clockwise fashion. As a result of the narrowing 72, an elastic deformation of the driving dog 67 occurs up to the dead center of the coupling element 66 and/or of the crank element 68. The crank element 68 moves further counterclockwise, and carries the coupling element 66, via the eccentric 68a, further with it. After the dead center has been exceeded, the driving dog 67 deforms back into its original contour and rotates counterclockwise about the axis 61. In this manner, force is transmitted to the pivot arm 62, which brings the camera device 10 into the operating position 3a according to FIG. 4, and pivots the same about the axis 61.

The invention claimed is:

1. A device, for a rear hatch of a vehicle, having a camera device which serves the purpose of capturing an image of the outside area of a vehicle, having a drive by means of which it is possible to transition the camera device between a standby mode and an operating mode, wherein
    in the standby mode, the camera device is protected from the outside area via a cover element,
    in the operating mode it is possible for the camera device to capture an image,
    an operating device is included which serves the purpose of operating a vehicle component,
    a support is included in which the camera device is arranged and which simultaneously functions as the housing for the camera device,
    the support has attachment interfaces such that the drive and the operating device are reliably held on the support, and form a unified prefabricated installation assembly which can be attached on the vehicle,
    wherein the unified prefabricated installation assembly can be installed from only one side as a unified installation assembly,
    wherein the camera device is sealed from the outside area of the vehicle by two seals, wherein a first seal lies between the support and the vehicle—the vehicle body panel—and a second seal lies between the cover element and the support, wherein the first seal is a double seal.

2. A device according to claim 1, wherein the drive has a functional connection to the camera device in such a manner that the camera device can be moved between a standby position in which the camera device is in the standby mode, and an operating position in which the camera device is in the operating mode.

3. A device according to claim 1, wherein the drive works together with a mechanism which has a functional connection to the camera device and/or the cover element, wherein the cover element is in a closed position when the camera device is in the standby mode, and is in an open position when the camera device is in the operating mode.

4. A device according to claim 1, wherein the operating device is a button which can be actuated from the outside area of the vehicle, and which is connected to a locking and unlocking device of the rear hatch of the vehicle.

5. A device according to claim 1, wherein the mechanism is designed in such a manner that the camera device can move on a path of a circular segment between the standby position and the operating position, wherein the path of a circular segment runs at least partially around the operating device.

6. A device according to claim 1, wherein the mechanism has an axis about which the camera device can move, wherein the axis is oriented to the platform of the vehicle.

7. A device according to claim 1, wherein the attachment interfaces are included on the outer contour of the support.

8. A device according to claim 1, wherein the drive and/or the operating device are attached on the support in a force-fitting and/or positive-fitting manner, via a snap-in connection and/or clip connection.

9. A device according to claim 1, wherein the mechanism is arranged at least partially inside of the support.

10. A device according to claim 1, wherein the mechanism has a pivot arm which connects the camera device to the axis, wherein the pivot arm is L-shaped, and/or has an extension which runs at an angle thereto.

11. A device according to claim 10, wherein the pivot arm has a recess for the camera device, and/or has attachment means, in order to fix the camera device on the pivot arm.

12. A device according to claim 10, wherein the recess and the attachment means form a unified monolithic component together with the pivot arm, wherein the recess is a ring-shaped opening through which the camera device partially extends, and the attachment means is a locking element which reliably holds the camera device in the opening.

13. A device according to claim 1, wherein the mechanism has a coupling element with a driving dog hinged onto the same and connected to the pivot arm in a torque-proof manner, wherein the coupling element can be moved by the drive.

14. A device according to claim 13, wherein a crank element with an eccentric is arranged between the coupling element and the drive, and said eccentric engages with the coupling element.

15. A device according to claim 1, wherein the support has locking elements on the outside thereof which serve the purpose of securing the installation assembly on the vehicle.

16. A device according to claim 1, wherein a part of the mechanism is arranged inside the support, and the pivot arm is arranged inside the support and is able to move.

17. A device according to claim 1, wherein a part of the mechanism is arranged outside of the support, and the coupling element and/or the driving dog and/or the crank element is/are positioned outside the support.

18. A device according to claim 1, wherein a rod element connects the cover element to the pivot arm and/or to the camera device, wherein the rod element is movably hinged on the cover element as well as on the pivot arm and/or on the camera device.

19. A device according to claim 1, wherein the camera device pivots about the axis from the standby position into the operating position at an angle $\alpha$ which is less than 30°.

20. A method for the attachment of the following components on a vehicle, on a rear hatch of a vehicle: a camera device which functions to capture images of the outside area of a vehicle, a drive, by means of which the camera device can be transitioned between a standby mode and an operating mode, wherein in the standby mode the camera device is protected via a cover element from the outside area, and in the operating mode it is possible for the camera device to capture an image, an operating device which serves the purpose of operating a vehicle component, the method compromising:
    (1) forming a prefabricated installation assembly, including a support on which the camera device, the drive, the cover element, and the operating device are attached,
    (2) guiding the installation assembly from the outside area of the vehicle through an opening of the vehicle and into an installation position inside the vehicle, and
    (3) achieving a reliable hold of the installation assembly by a mechanical securement,
        wherein the camera device is sealed from the outside area of the vehicle by two seals, wherein a first seal lies between the support and the vehicle—the vehicle body panel—and a second seal lies between the cover element and the support, wherein the first seal is a double seal.

21. A method according to claim 20, for the purpose of attaching a device, for a rear hatch of a vehicle, having a camera device which serves the purpose of capturing an image of the outside area of a vehicle, having a drive by means of which it is possible to transition the camera device between a standby mode and an operating mode, wherein in the standby mode, the camera device is protected from the outside area via a cover element,
    in the operating mode it is possible for the camera device to capture an image,
    an operating device is included which serves the purpose of operating a vehicle component, a support is included in which the camera device is arranged and which simultaneously functions as the housing for the camera device, the support has attachment interfaces such that the drive and the operating device are reliably held on the support, and form a unified installation assembly which can be attached on the vehicle.

* * * * *